United States Patent
Lahnala

(10) Patent No.: US 8,272,168 B2
(45) Date of Patent: Sep. 25, 2012

(54) SLIDING WINDOW ASSEMBLY HAVING IMPROVED SEALING

(75) Inventor: David W. Lahnala, Adrian, MI (US)

(73) Assignee: AGC Automotive Americas Co., Hebron, KY (US)

( * ) Notice: Subject to any disclaimer, the term of this patent is extended or adjusted under 35 U.S.C. 154(b) by 293 days.

(21) Appl. No.: 12/621,348

(22) Filed: Nov. 18, 2009

(65) Prior Publication Data

US 2010/0122497 A1    May 20, 2010

Related U.S. Application Data

(60) Provisional application No. 61/199,697, filed on Nov. 19, 2008.

(51) Int. Cl.
*E05D 15/06* (2006.01)
(52) U.S. Cl. ............. 49/413; 49/380; 49/408; 49/479.1; 49/489.1; 49/482.1
(58) Field of Classification Search ............. 49/413, 49/380, 125, 127, 408, 471, 476.1, 479.1, 49/489.1, 496.1, 456, 453, 482.1, 128; 296/190.1, 296/201
See application file for complete search history.

(56) References Cited

U.S. PATENT DOCUMENTS

| | | | |
|---|---|---|---|
| 3,656,260 A | 4/1972 | Weaver et al. | |
| 4,124,054 A | 11/1978 | Spretnjak | |
| 4,635,398 A * | 1/1987 | Nakamura | 49/413 |
| 4,688,752 A | 8/1987 | Barteck et al. | |
| 4,785,583 A | 11/1988 | Kawagoe et al. | |
| 4,788,796 A | 12/1988 | Matthews | |
| 4,795,667 A | 1/1989 | Armstrong | |
| 4,834,931 A | 5/1989 | Weaver | |
| 4,870,783 A * | 10/1989 | Hermann et al. | 49/477.1 |
| 4,962,601 A | 10/1990 | Gold | |
| 4,969,293 A | 11/1990 | Guillon | |
| 5,061,429 A | 10/1991 | Yoshihara et al. | |
| 5,228,740 A | 7/1993 | Saltzman | |
| 5,294,168 A | 3/1994 | Kronbetter | |
| 5,345,717 A | 9/1994 | Mori et al. | |
| 5,363,596 A | 11/1994 | Kronbetter | |
| 5,442,880 A | 8/1995 | Gipson | |
| 5,473,840 A | 12/1995 | Gillen et al. | |

(Continued)

FOREIGN PATENT DOCUMENTS

GB        2159562        12/1985

(Continued)

*Primary Examiner* — Katherine w Mitchell
*Assistant Examiner* — Marcus Menezes
(74) *Attorney, Agent, or Firm* — Howard & Howard Attorneys PLLC

(57) ABSTRACT

A sliding window assembly for a vehicle includes a fixed panel and a sliding panel. A track includes a first side wall connected to the fixed panel and a second side wall spaced from and extending along the first side wall defining a channel therebetween. The channel receives the sliding panel for movement of the sliding panel relative to the fixed panel. A horizontal seal is coupled to the first side wall in the channel for sealing between the first side wall and the sliding panel. A vertical seal is affixed to the fixed panel and intersects the horizontal seal at an intersection in the channel. The vertical seal extends along the wall into the channel beyond the horizontal seal at the intersection for preventing the flow of water from the horizontal seal past the vertical seal and onto an interior side of the fixed panel.

21 Claims, 10 Drawing Sheets

U.S. PATENT DOCUMENTS

| | | | |
|---|---|---|---|
| 5,505,023 A * | 4/1996 | Gillen et al. | 49/380 |
| 5,522,191 A | 6/1996 | Wenner et al. | |
| 5,531,046 A | 7/1996 | Kollar et al. | |
| 5,551,193 A | 9/1996 | Barnett | |
| 5,613,323 A | 3/1997 | Buening | |
| 5,669,181 A | 9/1997 | Kollar et al. | |
| 5,724,769 A | 3/1998 | Cripe et al. | |
| 5,775,029 A | 7/1998 | Buening | |
| 5,784,833 A | 7/1998 | Sponable et al. | |
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,996,284 A | 12/1999 | Freimark et al. | |
| 5,997,793 A | 12/1999 | Lahnala | |
| 6,018,913 A | 2/2000 | Lin | |
| 6,026,611 A | 2/2000 | Ralston et al. | |
| 6,038,819 A | 3/2000 | Klein | |
| 6,112,462 A | 9/2000 | Kolar | |
| 6,119,401 A | 9/2000 | Lin et al. | |
| 6,125,585 A | 10/2000 | Koneval et al. | |
| 6,223,470 B1 * | 5/2001 | Millard et al. | 49/374 |
| 6,324,788 B1 | 12/2001 | Koneval et al. | |
| 6,495,082 B1 | 12/2002 | Ash et al. | |
| 6,591,552 B1 | 7/2003 | Rasmussen | |
| 6,691,464 B2 | 2/2004 | Nestell et al. | |
| 6,766,617 B2 | 7/2004 | Purcell | |
| 6,810,622 B2 | 11/2004 | Oberheide | |
| 6,872,353 B2 | 3/2005 | Gillen et al. | |
| 6,890,468 B2 | 5/2005 | Caldoro et al. | |
| 6,902,224 B2 | 6/2005 | Weinert et al. | |
| 6,955,009 B2 | 10/2005 | Rasmussen | |
| 6,962,350 B2 | 11/2005 | Berry et al. | |
| 7,003,916 B2 | 2/2006 | Nestell et al. | |
| 7,051,478 B2 | 5/2006 | Bourque et al. | |
| 7,073,293 B2 | 7/2006 | Galer | |
| 7,094,375 B2 | 8/2006 | Nakata | |
| 7,150,126 B2 | 12/2006 | Rivera | |
| RE40,636 E | 2/2009 | Weinert et al. | |
| 7,810,284 B2 * | 10/2010 | Murphy et al. | 49/380 |
| 2003/0188487 A1 * | 10/2003 | Rasmussen | 49/116 |
| 2005/0044799 A1 * | 3/2005 | Kinross et al. | 49/413 |
| 2006/0032140 A1 | 2/2006 | Arimoto et al. | |
| 2006/0107600 A1 | 5/2006 | Nestell et al. | |
| 2007/0157522 A1 * | 7/2007 | Hebert et al. | 49/413 |
| 2008/0060275 A1 | 3/2008 | Recker | |
| 2008/0122262 A1 | 5/2008 | Cicala | |
| 2008/0263960 A1 | 10/2008 | Murphy et al. | |
| 2009/0019780 A1 * | 1/2009 | Hansel et al. | 49/456 |
| 2009/0113802 A1 | 5/2009 | Cicala | |
| 2009/0212591 A1 | 8/2009 | Seiple et al. | |

FOREIGN PATENT DOCUMENTS

| | | |
|---|---|---|
| GB | 2229479 | 9/1990 |
| WO | WO 2007090509 A1 * | 8/2007 |

* cited by examiner

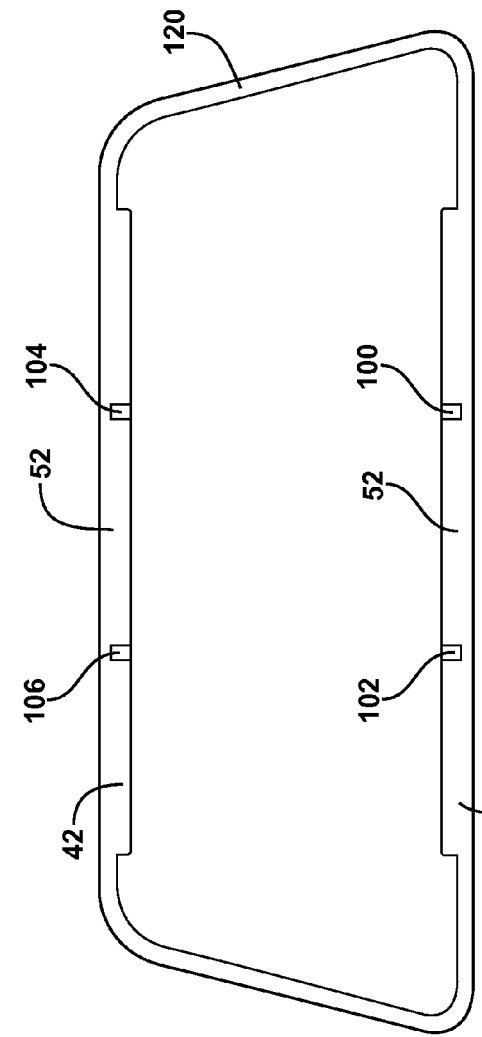
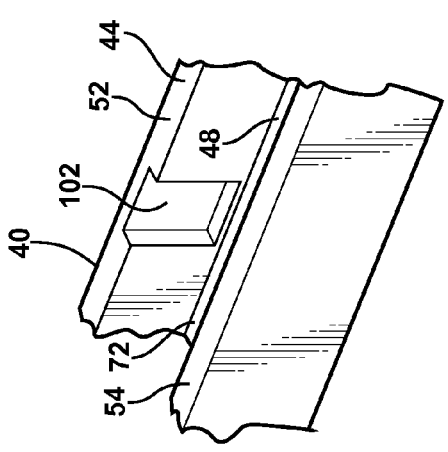
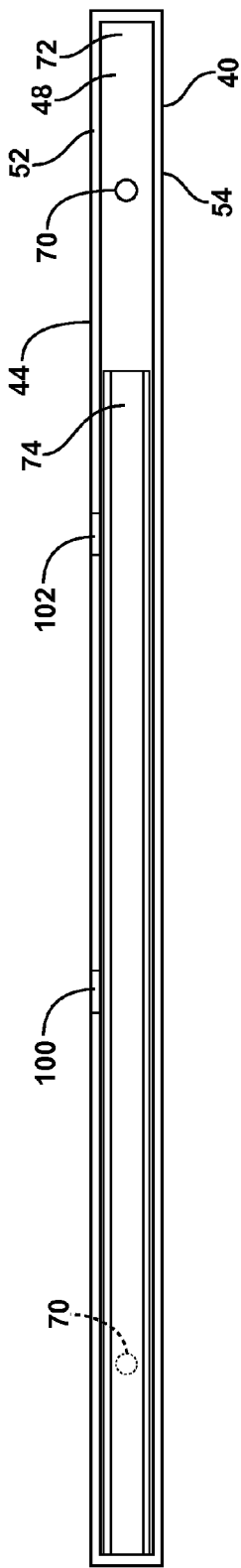
FIG - 8
FIG - 6
FIG - 7

SLIDING WINDOW ASSEMBLY HAVING IMPROVED SEALING

CROSS-REFERENCE TO RELATED APPLICATIONS

The subject patent application claims priority to and all the benefits of U.S. Provisional Patent Application Ser. No. 61/199,697, which was filed on Nov. 19, 2008, the entire specification of which is expressly incorporated herein by reference.

BACKGROUND OF THE INVENTION

1. Field of the Invention

The invention generally relates to a sliding window assembly for a vehicle. Specifically, the invention generally relates to a sliding window assembly having a vertical seal for managing water intrusion.

2. Description of the Related Art

Sliding window assemblies for vehicles are known in the art and have been widely used by vehicle manufacturers. The sliding window assemblies typically include first and the second fixed panels spaced from each other to define an opening therebetween. A first track and a second track are spaced from each other and are coupled to the first and the second fixed panels.

The first and second tracks each define a channel. A sliding panel is disposed within the channels and is movable across the opening between a closed position and an open position. The channels guide the sliding panel between the open and closed positions.

Typically a first vertical seal and a second vertical seal are disposed on the first and second fixed panels, respectively, and extend from the first track to the second track. Typically a first horizontal seal and a second horizontal seal are disposed along the first and second tracks, respectively, from the first fixed panel to the second fixed panel. The purpose of the vertical and horizontal seals is to seal the sliding panel to the first and second fixed panels when the sliding panel is in the closed position.

Under certain circumstances, such as inclement weather, water can enter around the vertical and horizontal seals and into the channels of the first and second tracks. This water can flow along the channels of the first and second tracks into the interior of the vehicle. Such a water leak can cause water damage, mold growth, etc., in the interior of the vehicle and gives the vehicle an overall feel of low quality. Accordingly, it would be advantageous to improve the sliding window assembly.

SUMMARY OF THE INVENTION AND ADVANTAGES

The present invention includes a sliding window assembly for a vehicle. The sliding window assembly comprises a first fixed panel and a second fixed panel spaced from and fixed relative to the first fixed panel defining an opening therebetween. A sliding panel is moveable relative to the first and second fixed panels for covering and uncovering the opening. A track includes a first side wall connected to the first fixed panel and to the second fixed panel and a second side wall spaced from and extending along the first side wall defining a channel therebetween receiving the sliding panel for movement of the sliding panel relative to the first and second fixed panels. A horizontal seal is coupled to the first side wall in the channel for sealing between the first side wall and the sliding panel. A vertical seal is affixed to the first fixed panel and intersects the horizontal seal at an intersection in the channel. The vertical seal extends along the first side wall into the channel beyond the horizontal seal at the intersection for preventing the flow of water from the horizontal seal past the vertical seal and onto an interior side of the first fixed panel.

The present invention also includes a sliding window assembly for a vehicle. The sliding window assembly comprises a fixed panel and a sliding panel moveable relative to the fixed panel between an open position and a closed position. A track includes a first side wall connected to the fixed panel and a second side wall spaced from and extending along the first side wall defining a channel therebetween receiving the sliding panel for movement of the sliding panel relative to the fixed panel. A horizontal seal is coupled to the first side wall in the channel for sealing between the first side wall and the sliding panel. A vertical seal is affixed to the fixed panel and intersects the horizontal seal at an intersection in the channel. The vertical seal extends along the wall into the channel beyond the horizontal seal at the intersection for preventing the flow of water from the horizontal seal past the vertical seal and onto an interior side of the fixed panel.

The sliding window assembly advantageously minimizes the flow of water from the horizontal and/or vertical seal along the channel into an interior of the vehicle, for example, to prevent the disadvantages described above. By extending along the wall into the channel beyond the horizontal seal at the intersection, the vertical seal obstructs the flow path of the water to prevent the flow of water to the interior of the vehicle. In other words, the water is dammed in the channel at the vertical seal to prevent the water from flowing to the interior of the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 is a perspective view of another embodiment of the pocket in the first track;

FIG. 7 is a top view of a first elongated member of the sliding window assembly of FIG. 3;

FIG. 8 is a perspective view of a portion of the sliding window assembly from an exterior side of the vehicle;

DETAILED DESCRIPTION OF THE INVENTION

Figure 1:
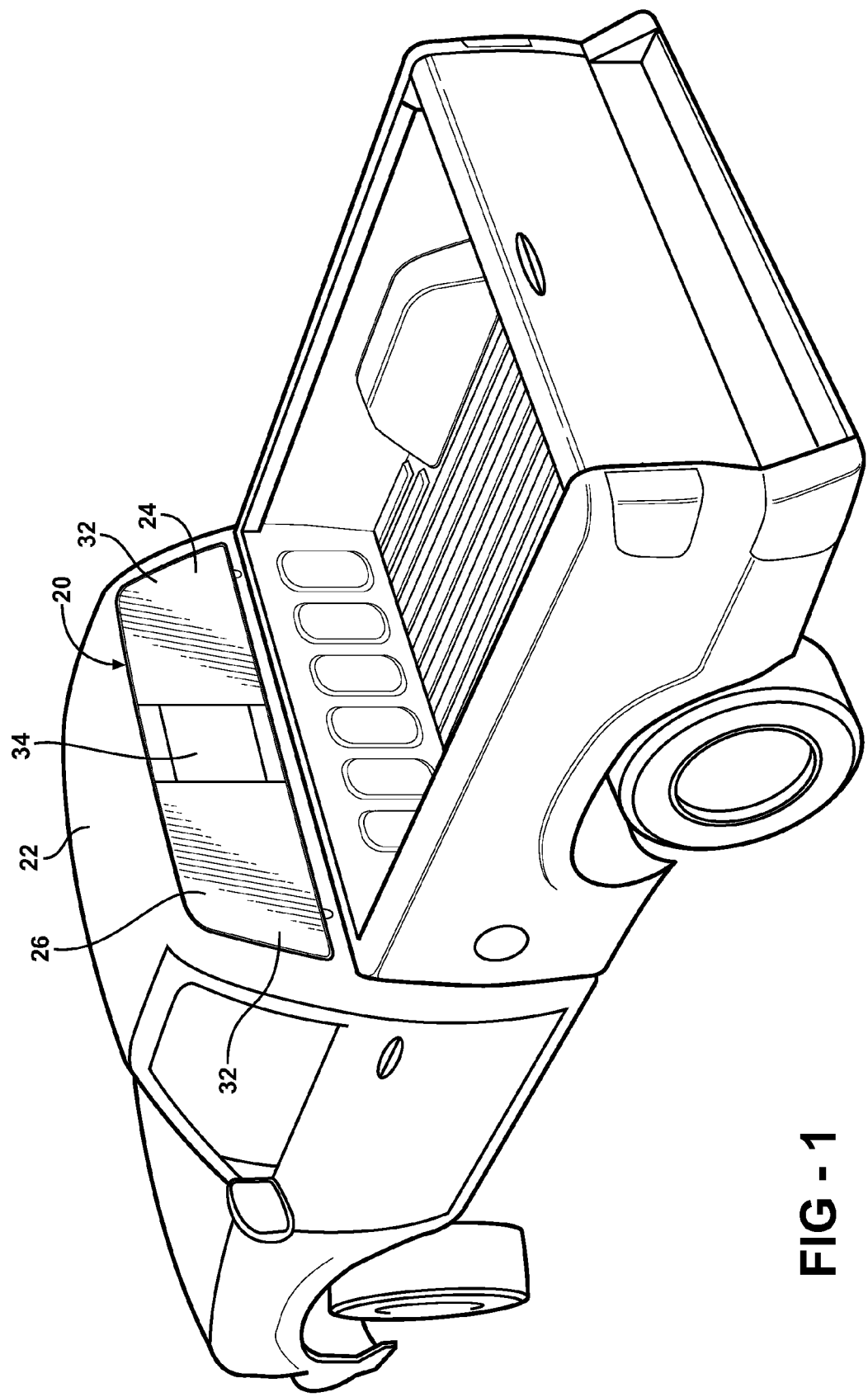
FIG. 1 is a perspective view of a vehicle including a sliding window assembly.

Referring to the Figures, wherein like numerals indicate corresponding parts throughout the several views, a sliding window assembly 20 for installation in a vehicle 22 is generally shown. Referring to FIG. 1, the sliding window assembly 20 is shown coupled to the vehicle 22, specifically as a backlite of a pickup truck. However, it is to be appreciated that the sliding window assembly 20 of the present invention can be implemented in other types of vehicles, as well as in non-vehicle applications.

As shown in FIGS. 1-4, the sliding window assembly 20 includes at least one fixed panel 24, 26 configured for coupling with the vehicle 22. The at least one fixed panel typically includes a first fixed panel 24 and a second fixed panel 26 spaced from and fixed relative to the first fixed panel 24 defining an opening 28 therebetween. The first and second fixed panels 24, 26 have an interior surface 30, shown in FIG. 3, for facing an interior of the vehicle 22 and an exterior surface 32, shown in FIG. 2, for facing an exterior of the vehicle 22 when the sliding window assembly 20 is coupled to the vehicle 22. It is to be appreciated that the sliding window assembly 20 can include one, two, or more fixed panels without departing from the nature of the present invention. It is to be appreciated that the adjectives "first," "second," "third," and "fourth," are used throughout merely as identifiers to distinguish among similar elements for illustrative purposes in the Detailed Description and should not be construed to imply or require order, importance, location, etc.

Figure 2:
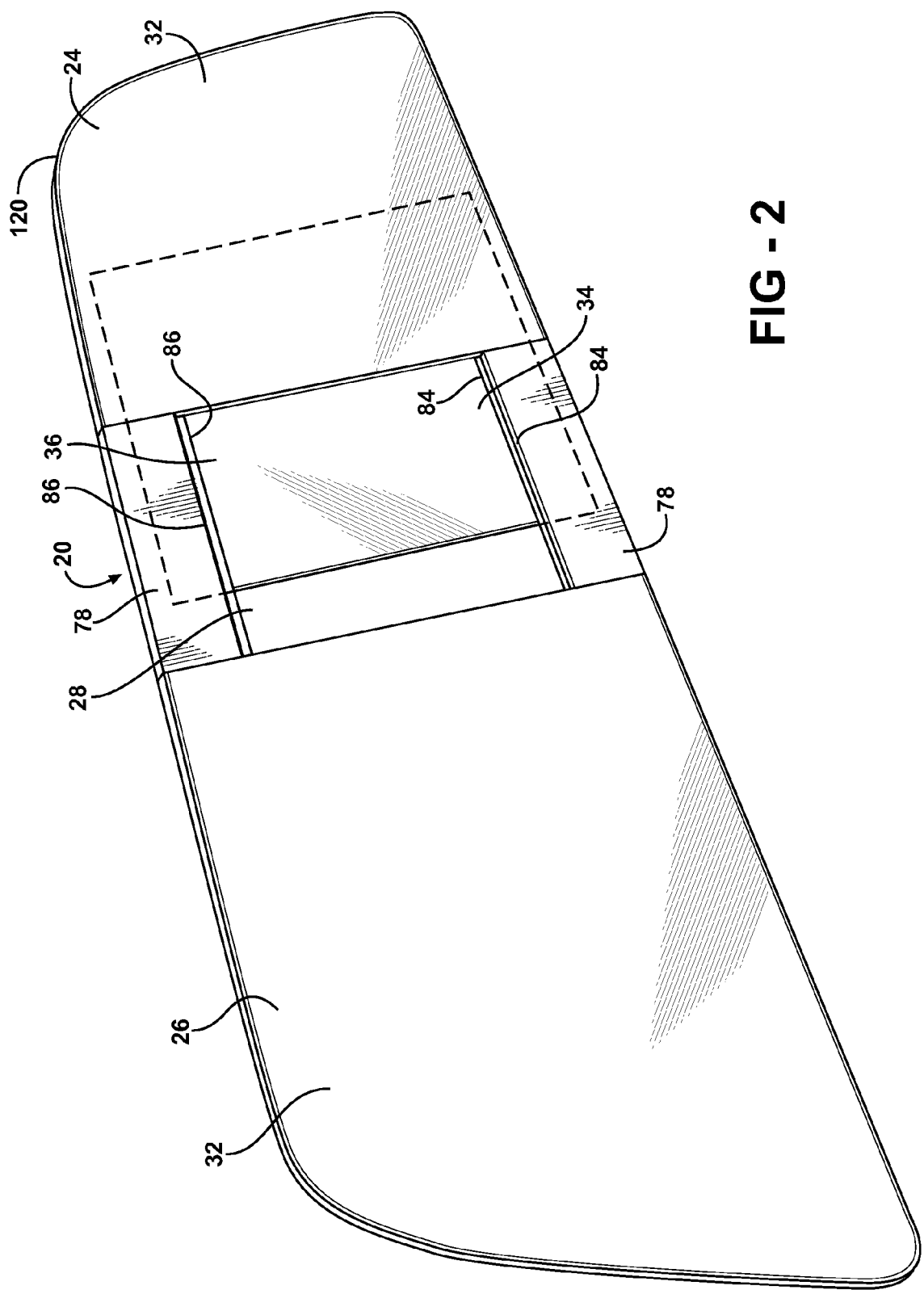
FIG. 2 is a perspective view of the sliding window assembly from an exterior side of the vehicle.
Figure 3:
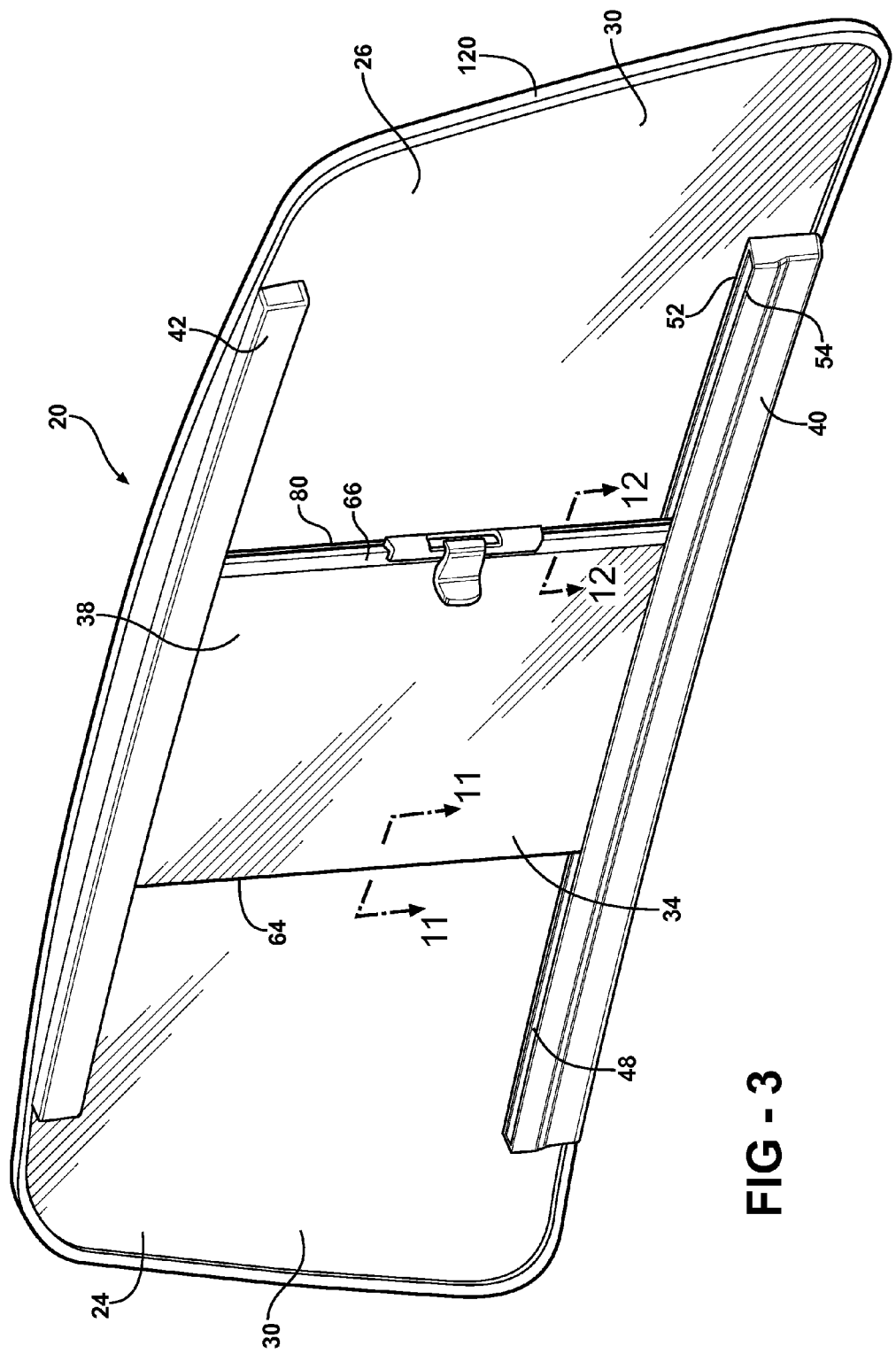
FIG. 3 is a perspective view of the sliding window assembly from an interior side of the vehicle including a first track and a second track.

With reference to FIGS. 1-3, a sliding panel 34 is moveable relative to the first and second fixed panels 24, 26 for covering the opening 28 in a closed position and for uncovering the opening 28 in an open position. The sliding panel 34 is covering the opening 28 in a closed position in FIGS. 1 and 3 and is partially covering the opening 28 between the open and closed positions in FIG. 2. Typically, the sliding panel 34 completely uncovers the opening 28 in the open position, which is not shown in the Figures. The first and second fixed panels 24, 26 and the sliding panel 34 are typically formed of glass. However, the first and second fixed panels 24, 26 and the sliding panel 34 may be formed from any suitable material such as plastic, metal, etc.

The sliding panel 34 presents an exterior surface 36 and an interior surface 38. The exterior surface 36 of the sliding panel 34 faces the exterior of the vehicle 22 and the interior surface 38 of the sliding panel 34 faces the interior of the vehicle 22 when the sliding window assembly 20 is coupled to the vehicle 22. The sliding panel 34 can be configured to be manually moved relative to the first and second fixed panels 24, 26 or can be configured to be moved under the power of a motor (not shown) operatively coupled to the sliding panel 34 for moving the sliding panel 34 relative to the first and second fixed panels 24, 26.

Figure 4:
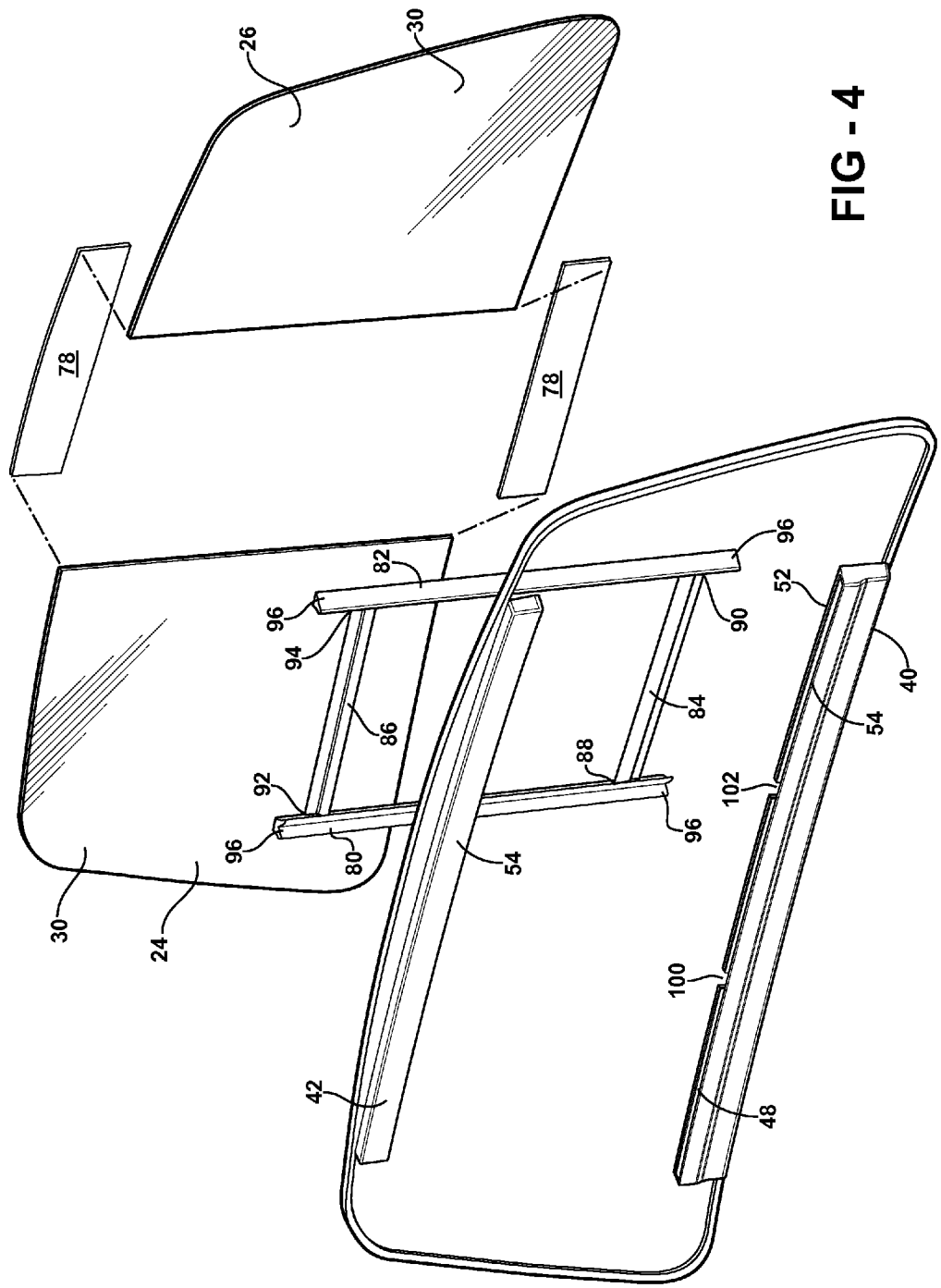
FIG. 4 is a partially exploded view of a portion of the sliding window assembly including pockets in the first track.
Figure 5:
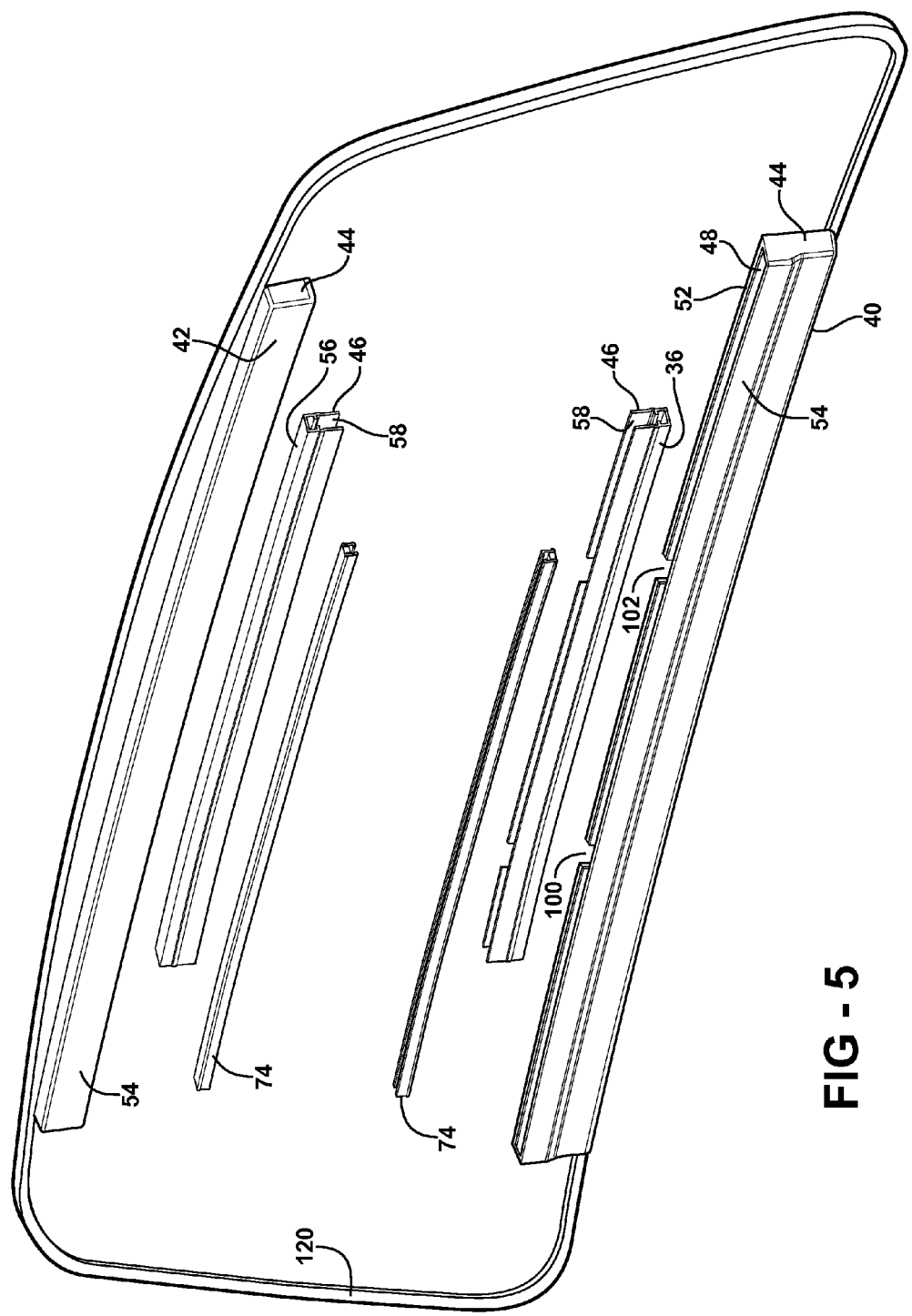
FIG. 5 is another partially exploded view of a portion of the sliding window assembly.
Figure 13:
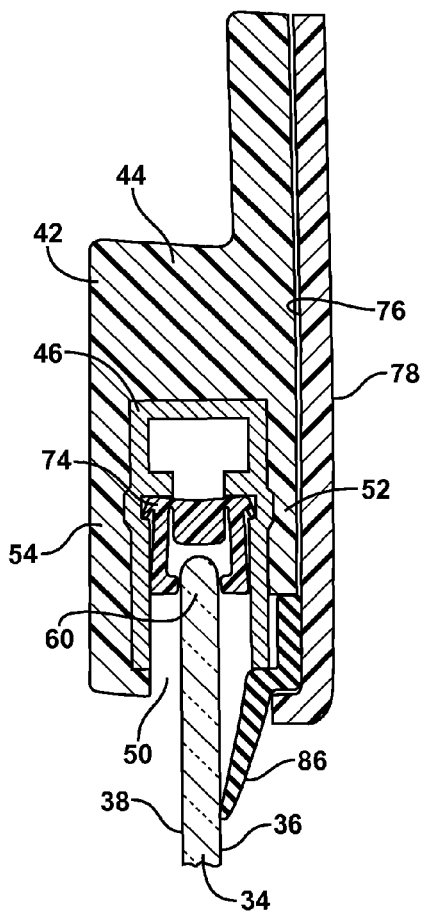
FIG. 13 is a cross-sectional view of an embodiment of the second track.
Figure 14:
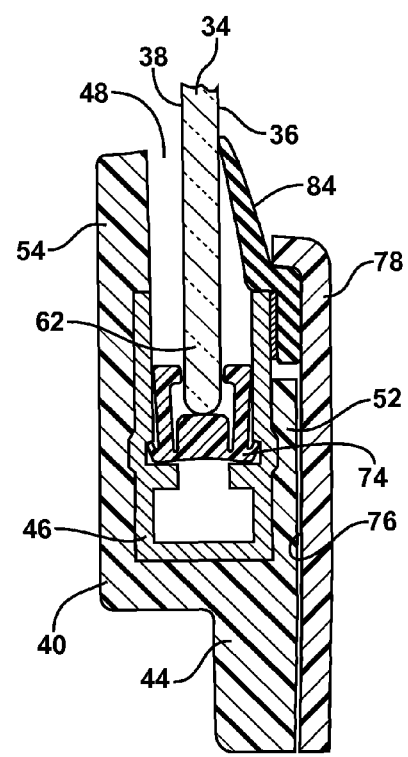
FIG. 14 is a cross-sectional view of an embodiment of the first track.

As best shown in FIGS. 3-5, the sliding window assembly 20 includes at least one track 40, 42, commonly referred to as a run channel in industry. In the embodiment shown in the Figures, at least one track includes a first track 40 coupled to the first and second fixed panels 24, 26 and a second track 42 coupled to the first and second fixed panels 24, 26 and spaced from and substantially parallel to the first track 40. However, it is to be appreciated that the sliding window assembly 20 can include one, two, or more tracks without departing from the nature of the present invention. The term "track" is used below to describe features applicable to the first and/or second tracks 40, 42. The tracks 40, 42 are shown generally in FIGS. 3-8 and 10 and detailed cross-sectional views of one embodiment of the second track 42 and the first track 40 are shown in FIGS. 13 and 14, respectively.

The track 40, 42 is connected to at least one, and typically both, of the first and second fixed panels 24, 26. The first track 40 is disposed at a bottom of the first and second fixed panels 24, 26 and the second track 42 is disposed at a top of the first and second fixed panels 24, 26. The first and second tracks 40, 42 span the opening 28 defined between the first and second fixed panels 24, 26. At least one, and typically both, of the first and second tracks 40, 42 rigidly interconnect the first and second fixed panels 24, 26.

With reference to FIG. 5, each of the first and second tracks 40, 42 typically includes an elongated member 44 and a rail 46 coupled to the elongated member 44. The elongated member 44 is connected to and extends between the first and second fixed panels 24, 26. It is to be appreciated that the tracks 40, 42 may alternatively be manufactured without the rail 46.

As best shown in FIGS. 3-7, each of the elongated members 44 defines a channel 48, 50 with the rail 46 disposed in the channel 48, 50. Specifically, the elongated member 44 of the first track 40 defines a first channel 48 and the elongated member 44 of the second track 42 defines a second channel 50. The term "channel" is used below to describe features applicable to the first and/or second channels 48, 50.

The elongated member 44 of the first and second tracks 40, 42 include a first side wall 52 connected to the first fixed panel 24 and to the second fixed panel 26 and a second side wall 54 spaced from and extending along the first side wall 52. The first and second side walls 54 define the channel 48, 50 therebetween. The channel 48, 50 is typically U-shaped for receiving the rail 46 and the sliding panel 34.

The rail 46 is rigid relative to the elongated member 44 for supporting the elongated member 44. In other words, the rail 46 provides structural reinforcement to the elongated member 44. The rail 46 is typically U-shaped and has an exterior surface 56 and an interior surface 58. The interior surface 58 receives the sliding panel 34. The rail 46 is typically formed of metal such as aluminum; however, it is to be appreciated that the rail 46 may be formed of any suitable material without departing from the scope of the present invention.

The sliding panel 34 is in sliding engagement with the first and second tracks 40, 42 and is slideable along the first and second tracks 40, 42 relative to the first and second fixed panels 24, 26. Specifically, the channel 48, 50 receives the sliding panel 34 for movement of the sliding panel 34 relative to the first and second fixed panels 24, 26. The first and second tracks 40, 42 guide the sliding panel 34 as the sliding panel 34 moves between the closed position for covering the opening 28 and the open position for uncovering the opening 28.

Figure 10:
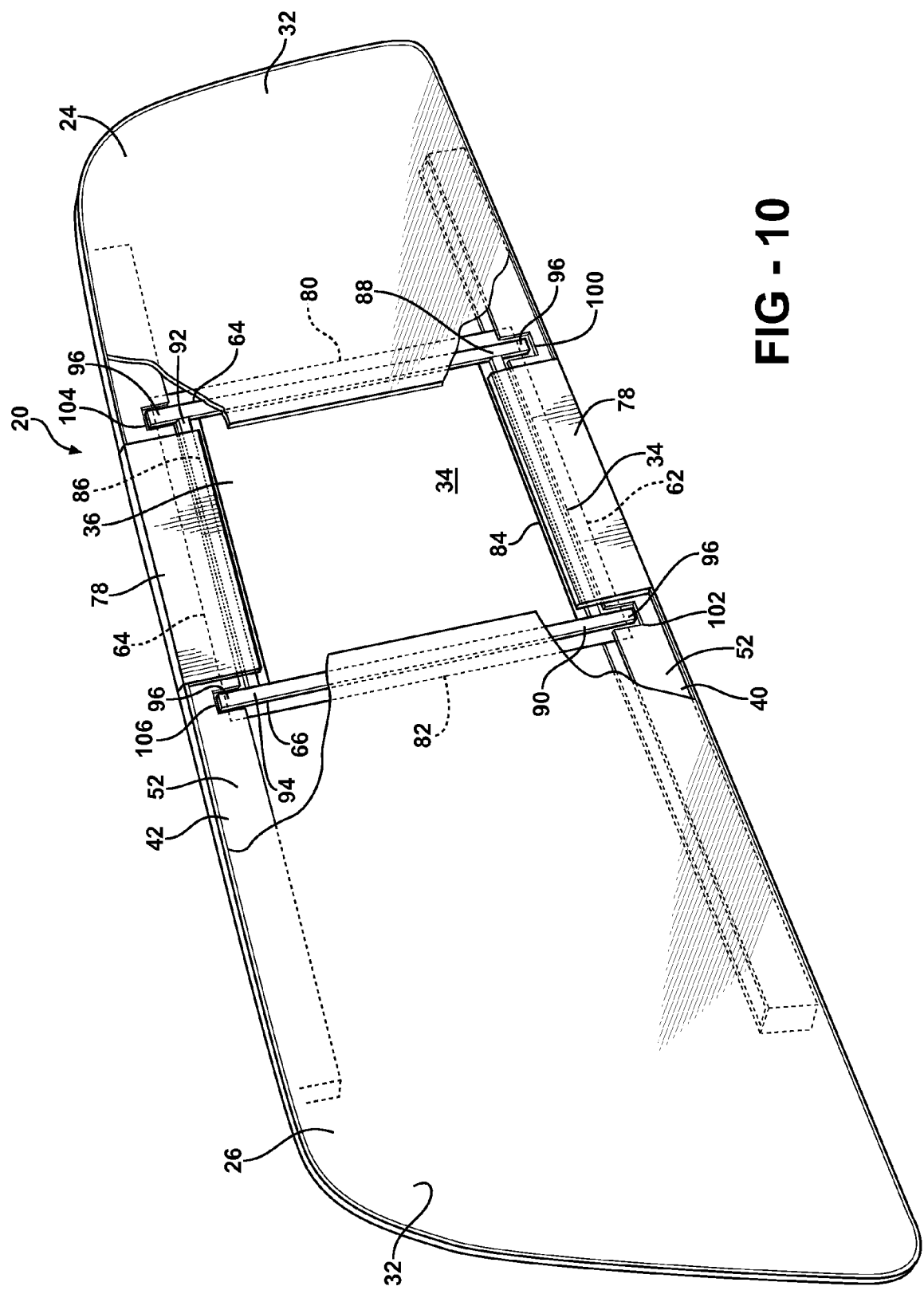
FIG. 10 is a partial cut-away view of the sliding window assembly of FIG. 2.

As best shown in FIGS. 10 and 13-14, the sliding panel 34 has a top edge 60 and a bottom edge 62 spaced from the top edge 60. The bottom edge 62 of the sliding panel 34 is disposed within the first track 40, i.e., by the interior surface 58 of the rail 46, and the top edge 60 of the sliding panel 34 is disposed within the second track 42, i.e., by the interior surface 58 of the rail 46.

As shown in FIGS. 3 and 10, the sliding panel 34 has a first edge 64 and a second edge 66 spaced from the first edge 64. The sliding panel 34 is disposed in an offset relationship to the first and second fixed panels 24, 26. Said differently, the first edge 64 of the sliding panel 34 overlaps the first fixed panel 24 and the second edge 66 of the sliding panel 34 overlaps the second fixed panel 26 when the sliding panel 34 is in the closed position. Alternatively, the first and second tracks 40, 42 can be configured such that the sliding panel 34 is flush with the first and second fixed panels 24, 26 when the sliding panel 34 is in the closed position.

The sliding panel 34 typically slides horizontally along the first and second tracks 40, 42, but it is to be appreciated that the sliding panel 34 can also slide in other directions, e.g., vertically, without departing from the nature of the present invention. In FIGS. 1 and 2, the sliding panel 34 slides to the right to the open position and slides to the left to the closed position, but it is to be appreciated that the sliding panel 34 can slide in any direction between the open and closed position without departing from the nature of the present invention. It should also be appreciated that the sliding panel 34 can slide in more than one direction from the closed to the open positions. Typically, when the sliding panel 34 is moveable horizontally, the first and second tracks 40, 42 extend generally horizontally along the periphery of the first and second fixed panels 24, 26. Alternatively, when the sliding panel 34 is moveable vertically, the first and second tracks 40, 42 extend generally vertically between the periphery of the first and second fixed panels 24, 26.

With reference to FIG. 7, the elongated member 44 defines at least one drain hole 70 in the channel 48, 50 for draining water from the channel 48, 50. Specifically, the elongated member 44 includes a bottom surface 72 of the channel 48, 50. The drain holes 70 are defined through the bottom surface 72 such that water drains downwardly through the drain holes 70 by gravity. It is to be appreciated that the drain hole 70 can be of any size and shape without departing from the nature of the present invention. It is also to be appreciated that the elongated member 44 can define any number of drain holes 70 without departing from the nature of the present invention.

As shown in FIG. 5, an insert 74 can be disposed in the channel 48, 50 between the rail 46 and the sliding panel 34 for reducing friction as the sliding panel 34 moves relative to the first and second fixed panels 24, 26. At least the bottom edge 62 of the sliding panel 34 is in sliding engagement with the insert 74 such that the sliding panel 34 is slideable along the insert 74. The insert 74 reduces the coefficient of friction between the sliding panel 34 and the tracks 40, 42 for reducing the work required to move the sliding panel 34 between the open and closed positions. The insert 74 is typically fixed within the first and second tracks 40, 42 to prevent the insert 74 from moving along the first and second tracks 40, 42.

The insert 74 can be disposed in the channel 48, 50 along the rail 46 and the bottom surface 72 of the channel 48, 50. The insert 74 can be disposed over at least one of the drain holes 70, in which case the insert 74 and the first track 40 are typically configured to drain water therebetween to the drain hole 70. The insert 74 may extend along the rail 46 at the bottom surface 72 of the channel 48, 50 such that the sliding panel 34 slides along the insert 74 from the closed position to the open position. Alternatively, the insert 74 may extend along only the rail 46, i.e., terminating at and not extending over ends of the rail 46. In such a configuration, the bottom surface 72 of the channel 48, 50 is typically configured to match the shape of the insert 74 such that the sliding panel 34 smoothly slides from the insert 74 to the bottom surface 72 as the sliding panel 34 slides from the closed position to the open position. Alternatively, in a configuration not including the insert 74, the rail 46 and the bottom surface 72 of the channel 48, 50 are aligned such that the sliding panel 34 smoothly slides from the rail 46 to the bottom surface 72 as the sliding panel 34 slides from the closed position to the open position.

The first and second tracks 40, 42 are typically connected to the first and second fixed panels 24, 26 by adhesive surface bonding. Although not required, adhesive surface bonding can be a process referred to in industry as glass encapsulation. The glass encapsulation process can be further defined as single-sided encapsulation, two-sided encapsulation, or three-sided encapsulation. For example, with single-sided encapsulation, the first and second tracks 40, 42 are coupled to the interior surface 30 of the first and second fixed panels 24, 26 leaving the exterior surface 30 of the first and second fixed panels 24, 26 free of adhesive surface bonding. In the embodiment shown in the Figures, the first and second tracks 40, 42 are coupled to the first and second fixed panels 24, 26 by two-sided encapsulation, i.e., the first and second tracks 40, 42 wrap around two sides of the first and second fixed panels 24, 26. It is to be appreciated that the adhesive surface bonding can be any type of adhesive surface bonding other than glass encapsulation without departing from the nature of the present invention.

In glass encapsulation, an encapsulant material forms at least a portion of the first and second tracks 40, 42 and connects the first and second tracks 40, 42 to the first and second fixed panels 24, 26. Specifically, the elongated member 44 is formed of the encapsulant and is coupled to the first and second fixed panels 24, 26 by glass encapsulation. The encapsulant material is typically introduced to the first and second fixed panels 24, 26 in molten form and solidifies as the first and second tracks 40, 42. As such, the first and second tracks 40, 42 are formed of encapsulated material, i.e., encapsulant material that was formed into the shape of the first and second tracks 40, 42 in the molten state and solidified as the first and second tracks 40, 42 during the glass encapsulation process. The encapsulant is typically polyvinyl chloride (PVC). However, it is to be appreciated that the encapsulant may be formed from any type of material suitable for glass encapsulation.

The elongated member 44 is connected to the rail 46 and to the first and second fixed panels 24, 26 by encapsulation. In other words, the encapsulant at least partially encompasses the exterior surface 56 of the rail 46 to couple the rail 46 and the first and second fixed panels 24, 26. In such an embodiment, the first and second tracks 40, 42 are each integral with the first and second fixed panels 24, 26. Specifically, the elongated member 44 of the first track 40 is integral with the rail 46 of the first track 40 and with the first and second fixed panels 24, 26 Likewise, the elongated member 44 of the second track 42 is integral with the rail 46 of the second track 42 and with the first and second fixed panels 24, 26. In other words, the first and second tracks 40, 42 and the first and second fixed panels 24, 26 form a single continuous unit. It is to be appreciated that even though the elongated member 44 and the rail 46 are integral, the elongated member 44 and the rail 46 are shown in an exploded view in FIG. 5 in order to show details of these parts.

As best shown in FIGS. 13-14, each elongated member 44 presents a mounting surface 76 with an applique 78 mounted to the mounting surface 76 of each elongated member 44. Specifically, as shown in FIG. 2, the applique 78 is situated in the opening 28 between the first and second fixed panels 24, 26 along the first and second tracks 40, 42. The first and second fixed panels 24, 26 and the applique 78 are substantially flush relative each other. The applique 78 is typically formed of a polycarbonate plastic, but can be formed of other plastics, glass, metal, and the like. In the configuration where the elongate members 44 are formed by glass encapsulation, the applique 78 is typically attached to the elongated member 44 by glass encapsulation. However, it is to be appreciated that the applique 78 may be attached to the elongated member 44 in any fashion, for example by adhesive.

As shown in FIGS. 4 and 9A-10, the sliding window assembly 20 includes first and second vertical seals 80, 82 and first and second horizontal seals 84, 86. The vertical seals 80, 82 and the horizontal seals 84, 86 collectively seal the sliding panel 34 relative to the first and second fixed panels 24, 26 and the first and second tracks 40, 42.

With reference to FIG. 10, the first vertical seal 80 is coupled to the first fixed panel 24 and the second vertical seal 82 is coupled to the second fixed panel 26. The vertical seals 80, 82 contact the sliding panel 34 when the sliding panel 34 is in the closed position. When the sliding panel 34 is in the open position, only the first vertical seal 80 contacts the sliding panel 34.

The first horizontal seal 84 is coupled to the first track 40 and the second horizontal seal 86 is coupled to the second track 42. The horizontal seals 84, 86 contact the sliding panel 34 when the sliding panel 34 is in the open position, closed position or any position in between. Specifically, the first and second horizontal seals 84, 86 are coupled to the first side wall 52 in the first and second channels 48, 50, respectively, for sealing between the first side wall 52 and the sliding panel 34. The first and second horizontal seals 84, 86 extend along the channel 48, 50 and typically abut the first side wall 52.

As best shown in FIGS. 10 and 13-14, the horizontal seals 84, 86 typically extend at least partially into the channel 48, 50 and partially out of the channel 48, 50 such that the horizontal seals 84, 86 seal against the sliding panel 34 outside of the channel 48, 50. Alternatively, the horizontal seals 84, 86 can be disposed entirely within the channel 48, 50 to seal against the sliding panel 34 inside the channel 48, 50. Alternatively, the horizontal seals 84, 86 can be disposed entirely to the exterior of the channel 48, 50, e.g., abutting an edge of the first side wall 52 and extending therefrom to seal against the sliding panel 34 to the exterior of the channel 48, 50.

Figure 9A:
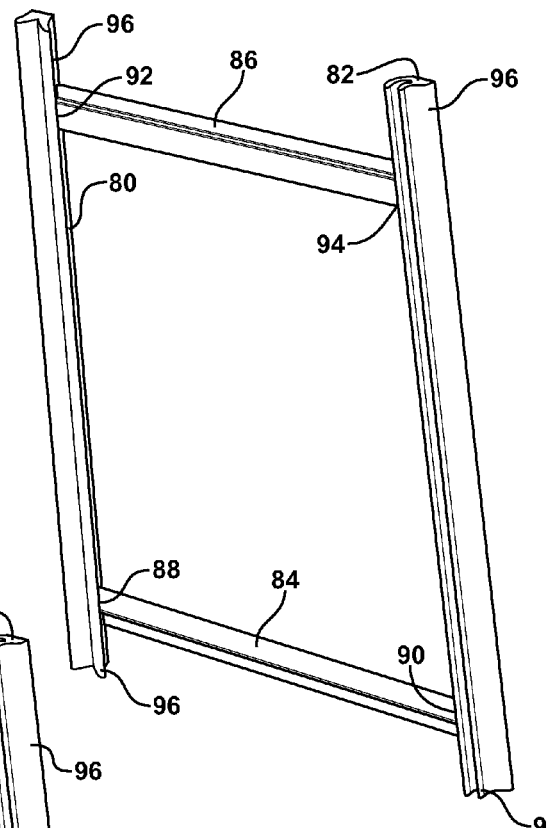
FIG. 9A is a perspective view of a pair of vertical seals and a pair of horizontal seals.
Figure 9B:
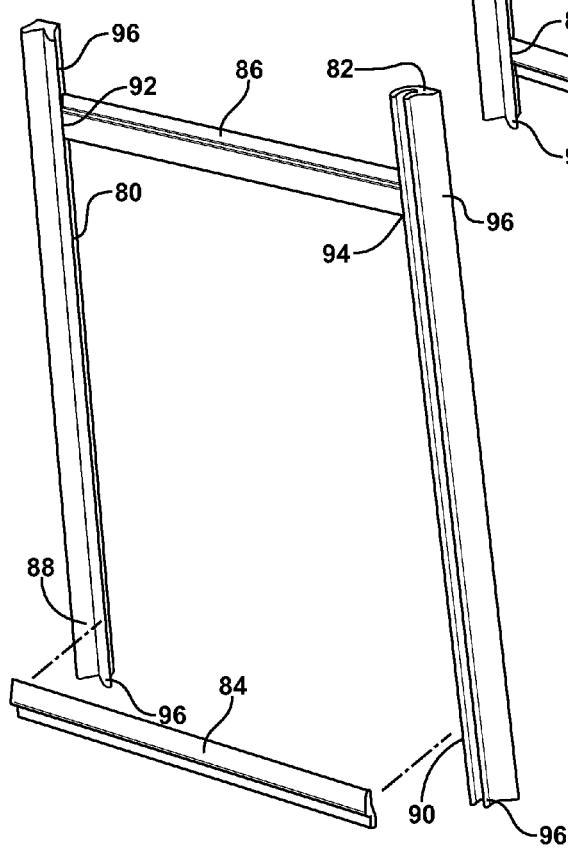
FIG. 9B is another embodiment of the pair of vertical seals and the pair of horizontal seals.

As best shown in FIG. 10, each of the first and second vertical seals 80, 82 extend into the first and second channels 48, 50 of the first and second tracks 40, 42, respectively. Referring to FIGS. 9A-B, the first and second vertical seals 80, 82 intersect the first and second horizontal seals 84, 86 at intersections in the channel 48, 50, i.e., the vertical seals 80, 82 and the horizontal seals 84, 86 define intersections 88, 90, 92, 94 where one of the vertical seals 80, 82 and one of the horizontal seals 84, 86 intersect. More specifically, the first vertical seal 80 intersects the first horizontal seal 84 at a first intersection 88 and intersects the second horizontal seal 86 seal at a third intersection 92. The second vertical seal 82 intersects the first horizontal seal 84 at a second intersection 90 and intersects the second horizontal seal 86 at a fourth intersection 94. In selected sections below, the term "intersection" is used for simplicity and is applicable to any one of the first, second, third, and/or fourth intersections 88, 90, 92, 94. Also, as set forth above, the adjectives "first," "second," "third," and "fourth," are used throughout merely as identifiers to distinguish among similar elements for illustrative purposes in the Detailed Description and should not be construed to imply or require order, importance, location, etc.

Referring again to FIG. 10, at least one of the vertical seals 80, 82 extend along the first side wall 52 into the channel 48, 50 beyond the horizontal seal 84, 86 at the intersection 88, 90, 92, 94 for preventing the flow of water from the horizontal seal 84, 86 past the vertical seal 80, 82 and onto the interior surface 30 of the first and/or second fixed panel 24, 26, as described further below. In other words, at least one of the vertical seals 80, 82 includes an extension portion 96 extending from the horizontal seal 84, 86 from the intersection 88, 90, 92, 94 further into the channel 48, 50. In the embodiment shown in the Figures, the first and second vertical seals 80, 82 both include one extension portion 96 extending into the first channel 48 and one extension portion 96 extending into the second channel 50. It is to be appreciated that the sliding window assembly 20 can include one, all, or a combination of the four extension portions 96 shown in the Figures without departing from the nature of the present invention.

As best shown in FIGS. 5-8 and 10, the first side wall 52 of one of the tracks 40, 42 defines at least one pocket 100, 102, 104, 106 adjacent the channel 48, 50 with one of the vertical seals 80, 82 extending into the pocket 100, 102, 104 106, i.e., the extension portion 96 extends from the intersection 88, 90, 92, 94 further into the channel 48, 50. More specifically, the first track 40 defines a first pocket 100 at the first intersection 88 and a second pocket 102 at the second intersection 90. The second track 42 defines a third pocket 104 at the third intersection 92 and a fourth pocket 106 at the fourth intersection 94. It is to be appreciated that the sliding window assembly 20 can include one, all, or a combination of the first, second, third, and fourth pockets 100, 102, 104, 106 shown in the Figures without departing from the nature of the present invention. In selected sections below, the term "pocket" is used for simplicity and is applicable to any one of the first, second, third, and/or fourth pockets 100, 102, 104, 106.

As shown in FIGS. 5, 7-8, and 10, the pocket 100, 102, 104, 106 can extend through the first side wall 52 to the first fixed panel 24. In such an embodiment, the vertical seal 80, 82 is affixed to one of the first and second fixed panels 24, 26 in the pocket 100, 102, 104, 106 and extends from the fixed panel 24, 26 to the sliding panel 34 in the channel 48, 50. Specifically, the first vertical seal 80 is affixed to the first fixed panel 24 in the first pocket 100 and extends from the first fixed panel 24 to the sliding panel 34 in the first channel 48. The first vertical seal 80 is also affixed to the first fixed panel 24 in the second pocket 102 and extends from the first fixed panel 24 to the sliding panel 34 in the second channel 50. The second vertical seal 82 is affixed to the second fixed panel 26 in the third pocket 104 and extends from the second fixed panel 26 to the sliding panel 34 in the first channel 48. The second vertical seal 82 is also affixed to the second fixed panel 26 in the fourth pocket 106 and extends from the second fixed panel 26 to the sliding panel 34 in the second channel 50.

The pocket 100, 102, 104, 106 can also extend through the rail 46, i.e., the rail 46 can be notched, as shown in FIG. 5. Alternatively, the pocket 100, 102, 104, 106 can be defined only in the elongated member 44 such that the vertical seal 80, 82 can extend between the rail 46 and the elongated member 44 in the pocket 100, 102, 104, 106.

Under certain circumstances, water may enter around the vertical seals 80, 82 and/or the horizontal seals 84, 86. The extension portion 96 obstructs the flow path of the water to prevent the flow of water to an interior surface 30 of the first and/or second fixed panel 24, 26. With reference to FIG. 13, water can, for example, enter into the sliding window assembly 20 between the second horizontal seal 86 and the sliding panel 34 and travel along the sliding panel 34 toward one of the vertical seals 80, 82. Water can also enter into the sliding window assembly 20 between the first horizontal seal 84 and the applique 78 and travel along the first side wall 52 to toward one of the vertical seals 80, 82. The extension portions 96 in the second channel 50 obstructs both of these flow paths to prevent the flow of water to an interior surface 30 of the first and/or second fixed panels 24, 26. Because the extension portions 96 extend beyond the second horizontal seal 84 into the second channel 50, the water is dammed at the extension portions 96, i.e., the extension portions 96 prevent the water from flowing to the interior surface 30 of the first and/or second fixed panels 24. It is to be appreciated that the previous description describes the extension portion 96 in the second channel 50 for exemplary purposes and the extension portions 96 in the first channel 48 function as described immediately above. In addition, with respect to the extension portions 96 extending into the second channel 50, the force of gravity prevents the water from flowing upwardly further into the channel 48, 50.

In one embodiment, the vertical seal 80, 82 can be affixed to the track 40, 42 in the pocket 100, 102, 104, 106 and extend from the track 40, 42 to the sliding panel 34. For example, in the embodiment where the pockets 100, 102, 104, 106 extend through the first side wall 52, the vertical seal 80, 82 can overlap the first side wall 52 and can be affixed to the fixed panel 24, 26 and/or the first side wall 52. Alternatively, as shown in FIG. 6, the pocket 100, 102, 104, 106 can extend only partially into the first side wall 52, i.e., does not extend through the first side wall 52 to the fixed panel 24, 26. In such a configuration, vertical seal 80, 82 can be affixed to the first side wall 52 in the pocket 100, 102, 104, 106. It is to be appreciated that the third pocket 104 is shown in FIG. 6 for exemplary purposes and the first, second, and fourth pockets 100, 104, 106 can be similar to the third pocket 104.

With reference to FIG. 10, the first and second vertical seals 80, 82 are affixed to the first and second fixed panels 24, 26, respectively, from the first track 40 to the second track 42 and the first and second horizontal seals 84, 86 are typically affixed to the first and second tracks 42, respectively. The vertical seals 80, 82 and the horizontal seals 84, 86 are typically adhered to the first and second fixed panels 24, 26 and the first and second tracks 42 with tape. However, it is to be appreciated that the vertical seals 80, 82 and the horizontal seals 84, 86 may be coupled to the first and second fixed panels 24, 26 and the tracks 40, 42 in any fashion, for example, with adhesive. The vertical seals 80, 82 and horizontal seals 84, 86 are formed of any suitable material without departing from the nature of the present invention. For example, the vertical seals 80, 82 and the horizontal seals 84, 86 are preferably ethylene propylene diene monomer. Alternatively, for example, the vertical seals 80, 82 and horizontal seals 84, 86 are thermoplastic vulcanizates or thermoplastic elastomer. Typically, the vertical seals 80, 82 and the horizontal seals 84, 86 are applied after the adhesive surface bonding, e.g., the glass encapsulation of the first and second tracks 40, 42 to the first and second fixed panels 24, 26, but can be applied at any time.

At least one of the vertical seals 80, 82 can be integral with one horizontal seal 84, 86, i.e., formed as a single part or joined in a firm and substantially permanent manner. As shown in FIG. 9A, the first and second vertical seals 80, 82 and the first and second horizontal seals 84, 86 are integral. Alternatively, as shown in FIG. 9B, the second horizontal seal 86 is integral with the first and second vertical seals 80, 82 and the first horizontal 84 seal abuts the first and second vertical seals 80, 82. In such a configuration, the first horizontal seal 84 is adhered to the vertical seals 80, 82 with, for example, glue or felt tape, to seal against water intrusion. When integral, the vertical seals 80, 82 are typically joined by corners molded to the vertical seals 80, 82 and the horizontal seals 84, 86. It is to be appreciated that the vertical seals 80, 82 and both the horizontal seals 84, 86 may be formed separately or may be integral with one another without departing from the scope of the present invention.

Figure 11:
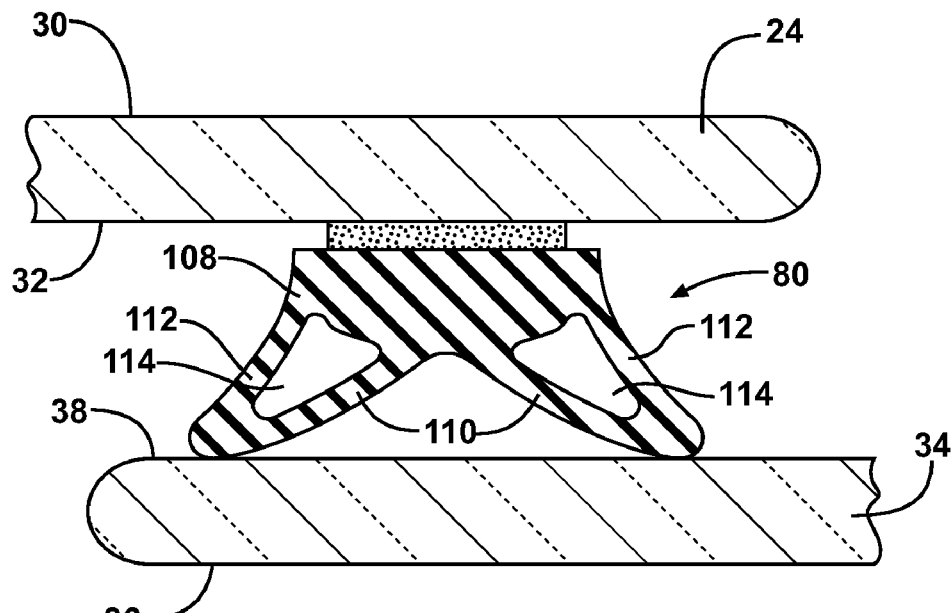
FIG. 11 is a cross-sectional view along line 11 of FIG. 3.

As best shown in FIG. 11, the first vertical seal 80 includes a base 108 connected to the first fixed panel 24 and a pair of lips 110 extending from the base in a V-shaped orientation. A pair of webs 112 extends from the pair of lips 110, respectively, to the base 108 with the webs 112 spaced from the lips 110 at the base 108, i.e., defining voids 114 between the webs 112 and the lips 110. The webs 112 prevent the lips 110 from flipping and contact the sliding panel 34 as the sliding panel 34 moves between the open and the closed position. Specifically, the webs 112 and the voids 114 allow for dispersion of a compression load applied to the first vertical seal 80 by the sliding panel 34.

Figure 12:
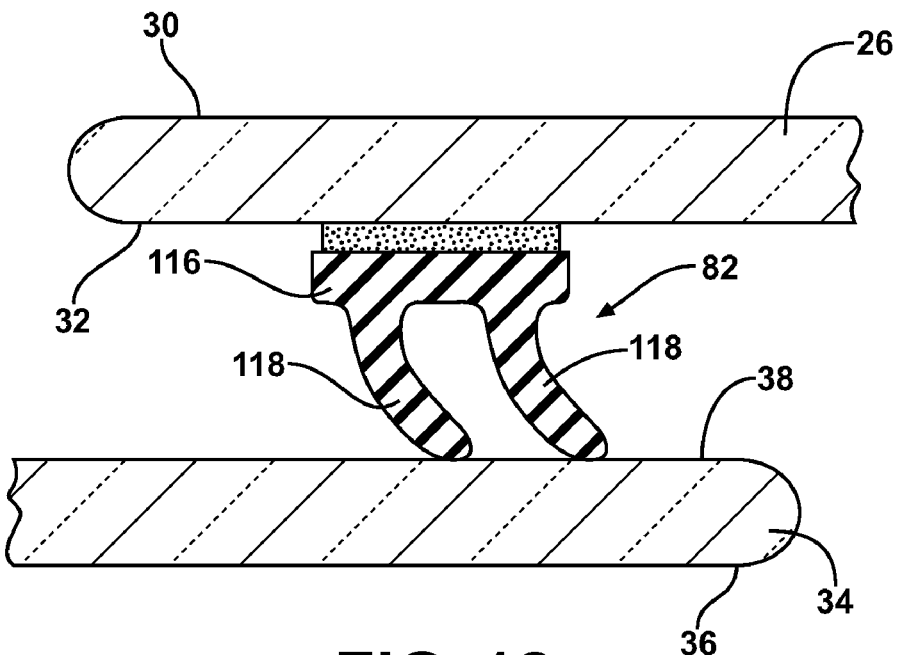
FIG. 12 is a cross-sectional view along line 12 of FIG. 3.

As best shown in FIG. 12, the second vertical seal 82 has a body portion 116 and a pair of fingers 118. The body portion 116 of the second vertical seal 82 is coupled to the second fixed panel 26 and the ends of the fingers 118 contact the sliding panel 34. The fingers 118 contact the sliding panel 34 when the sliding panel 34 is in the closed position.

Although not required, the sliding window assembly 20 can include a frame member 120 surrounding a periphery of the first and second fixed panels 24, 26. The frame member 120 may be integral with the first and second tracks 40, 42. The frame member 120 can be formed by encapsulation and can comprise any suitable material.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A sliding window assembly for a vehicle, said sliding window assembly comprising:
   a first fixed panel;
   a second fixed panel spaced from and fixed relative to said first fixed panel defining an opening therebetween;
   a sliding panel moveable relative to said first and second fixed panels for covering and uncovering said opening;
   a track including a first side wall connected to said first and second fixed panels and a second side wall spaced from and extending along said first side wall defining a U-shaped channel therebetween receiving said sliding panel for movement of said sliding panel relative to said first and second fixed panels;
   a horizontal seal coupled to said track and extending along said U-shaped channel for sealing between said track and said sliding panel;
   a vertical seal affixed to said first fixed panel and intersecting said horizontal seal at an intersection;
   wherein said vertical seal extends beyond said horizontal seal at said intersection and along said first side wall in said U-shaped channel for preventing the flow of water from said horizontal seal past said vertical seal and onto an interior side of said first fixed panel.

2. The sliding window assembly as set forth in claim 1 wherein said first side wall of said track defines a pocket adjacent said U-shaped channel with said vertical seal extending into said pocket.

3. The sliding window assembly as set forth in claim 2 wherein said vertical seal is affixed to said track in said pocket and extends from said track to said sliding panel.

4. The sliding window assembly as set forth in claim 2 wherein said pocket extends through said first side wall to said first fixed panel.

5. The sliding window assembly as set forth in claim 4 wherein said vertical seal is affixed to said first fixed panel in said pocket and extends from said first fixed panel to said sliding panel in said U-shaped channel.

6. The sliding window assembly as set forth in claim 1 further comprising a second vertical seal affixed to said second fixed panel and intersecting said horizontal seal at a second intersection in said U-shaped channel spaced from said intersection.

7. The sliding window assembly as set forth in claim 6 wherein said second vertical seal extends along said first side wall into said U-shaped channel beyond said horizontal seal at said second intersection for preventing the flow of water from said horizontal seal past said second vertical seal and onto an interior side of said second fixed panel.

8. The sliding window assembly as set forth in claim 1 further comprising a second track spaced from said first track and connected to said first and second fixed panels and defining a second channel receiving said sliding panel.

9. The sliding window assembly as set forth in claim 1 further including a second horizontal seal disposed in said second channel for sealing between said second track and said sliding panel wherein said vertical seal extends into said U-shaped channel and intersects said second horizontal seal at a third intersection in said second channel and wherein said second vertical seal extends into said second channel beyond said horizontal seal at said third intersection.

10. The sliding window assembly as set forth in claim 1 wherein said vertical seal and said horizontal seal are integral.

11. The sliding window assembly as set forth in claim 1 wherein said horizontal seal abuts said vertical seal.

12. The sliding window assembly as set forth in claim 11 wherein said vertical seal is adhered to said horizontal seal.

13. The sliding window assembly as set forth in claim 1 wherein at least a portion of said track is formed of an encapsulated material and wherein said horizontal seal is connected to said track by encapsulation.

14. The sliding window assembly as set forth in claim 1 wherein said track is disposed above said fixed panel and said sliding panel.

15. The sliding window assembly as set forth in claim 1 wherein said vertical seal includes a base connected to said first fixed panel and a pair of lips extending from said base in a V-shaped orientation.

16. The sliding window assembly as set forth in claim 15 further comprising a pair of webs extending from said pair of lips, respectively, to said base with said webs spaced from said lips at said base.

17. A sliding window assembly for a vehicle, said sliding window assembly comprising:
a fixed panel;
a sliding panel moveable relative to said fixed panel between an open position and a closed position;
a track including a first side wall connected to said fixed panel and a second side wall spaced from and extending along said first side wall defining a U-shaped channel therebetween receiving said sliding panel for movement of said sliding panel relative to said fixed panel;
a horizontal seal coupled to said track and extending along in said U-shaped channel for sealing between said track and said sliding panel;
a vertical seal affixed to said fixed panel and intersecting said horizontal seal at an intersection;
wherein said vertical seal extends beyond said horizontal seal at said intersection and along said wall in said U-shaped channel for preventing the flow of water from said horizontal seal past said vertical seal and onto an interior side of said fixed panel.

18. The sliding window assembly as set forth in claim 17 wherein said first side wall defines a pocket adjacent said U-shaped channel with said vertical seal extending into said pocket.

19. The sliding window assembly as set forth in claim 18 wherein said vertical seal is affixed to said track in said pocket and extends from said track to said sliding panel.

20. The sliding window assembly as set forth in claim 18 wherein said pocket extends through said first side wall to said fixed panel.

21. The sliding window assembly as set forth in claim 20 wherein said vertical seal is affixed to said fixed panel in said pocket and extends from said fixed panel to said sliding panel in said U-shaped channel.

* * * * *